March 24, 1925.
A. W. LEMMON
PORTABLE CONVEYER
Filed Dec. 24, 1921
1,530,564
3 Sheets-Sheet 1
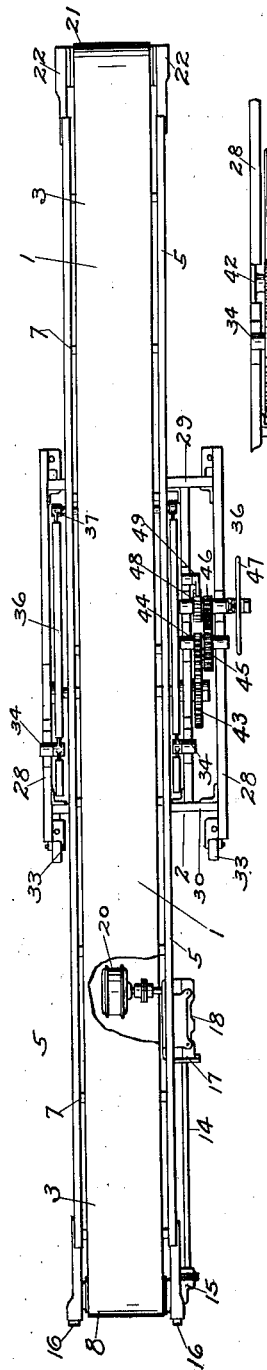
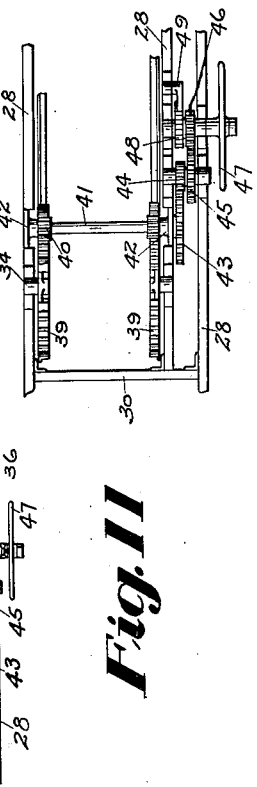
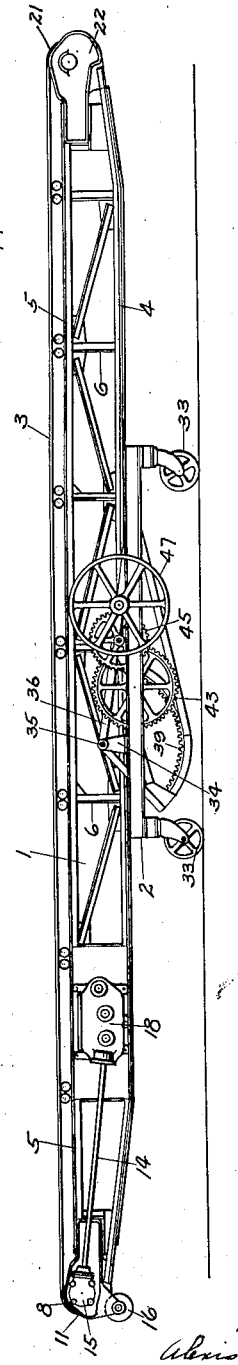

March 24, 1925.
A. W. LEMMON
PORTABLE CONVEYER
Filed Dec. 24, 1921
1,530,564
3 Sheets-Sheet 2
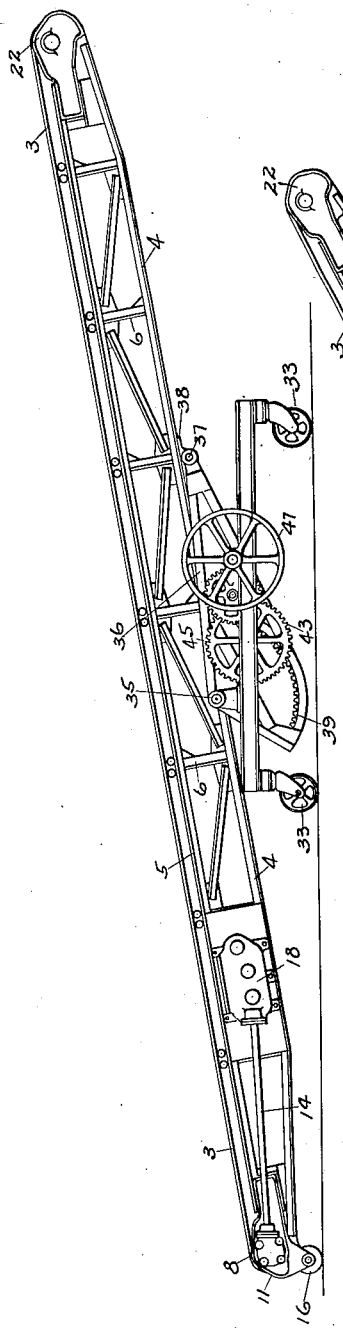
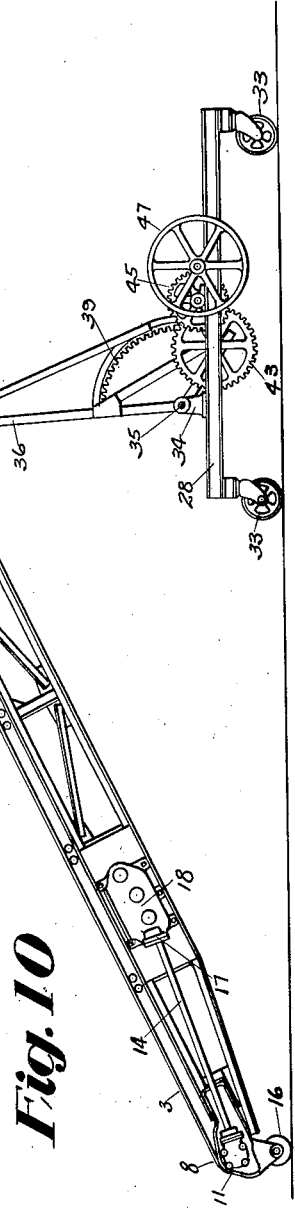
INVENTOR
Alexis W. Lemmon
ATTORNEY March 24, 1925.   1,530,564
A. W. LEMMON
PORTABLE CONVEYER
Filed Dec. 24, 1921    3 Sheets-Sheet 3
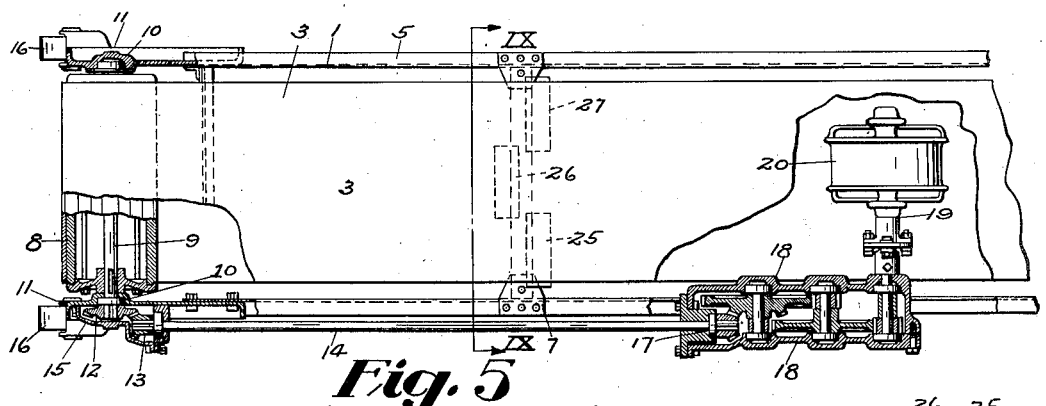
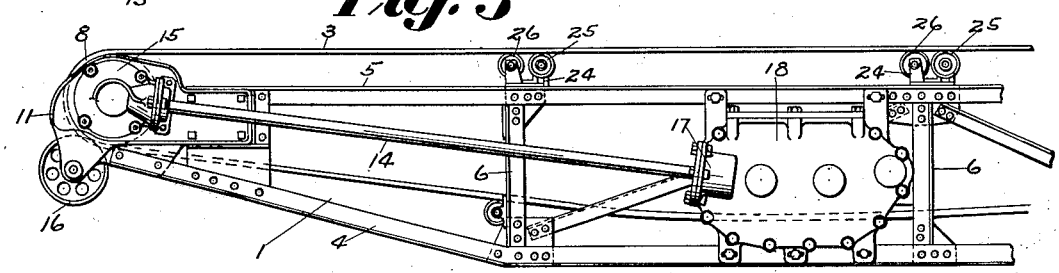
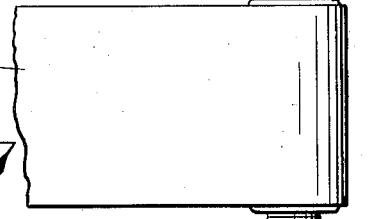
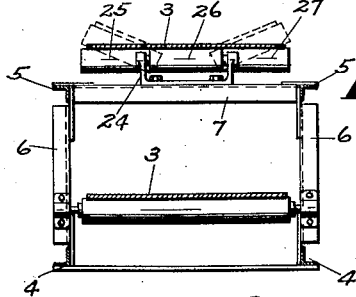
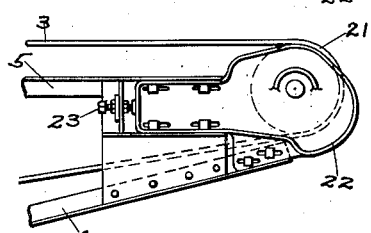
INVENTOR
BY
ATTORNEY

Patented Mar. 24, 1925.

1,530,564

UNITED STATES PATENT OFFICE.

ALEXIS W. LEMMON, OF COLUMBUS, OHIO, ASSIGNOR TO THE JEFFREY MANUFACTURING COMPANY, OF COLUMBUS, OHIO, A CORPORATION OF OHIO.

PORTABLE CONVEYER.

Application filed December 24, 1921. Serial No. 524,638.

*To all whom it may concern:*

Be it known that I, ALEXIS W. LEMMON, a citizen of the United States, residing at Columbus, in the county of Franklin and State of Ohio, have invented certain new and useful Improvements in Portable Conveyers, of which the following is a specification, reference being had therein to the accompanying drawing.

The present invention relates to certain new and useful improvements in portable conveyers, and particularly to that class of conveyers which are adapted to be moved over the floors of docks or warehouses, and to be adjusted to various inclined operative positions adjacent the material which is to be handled.

The especial object of this invention is to provide in a machine of the class described, improved mechanism for supporting the conveyer in the desired relation to the material which is to be handled, and to adjust it to various inclined positions convenient for piling packages, and for similar purposes.

The devices by which I attain this object are fully set forth in the following specification and illustrated in the accompanying drawings, of which—

Fig. 1 is a general plan view of the preferred embodiment of my invention.

Fig. 2 is a side elevation of the machine illustrated in Fig. 1, adjusted to its horizontal or traveling position.

Fig. 3 is a view similar to Fig. 2, showing the conveyer partially elevated.

Fig. 4 is a view similar to Fig. 2, showing the conveyer fully elevated to its extreme position of vertical adjustment.

Fig. 5 is a fragmentary plan view on an enlarged scale of the forward, or driving end of the conveyer, certain parts being broken away to reveal other parts.

Fig. 6 is a side elevation of Fig. 5.

Fig. 7 is a fragmentary plan view on an enlarged scale, of the rearward, or driven end of the conveyer.

Fig. 8 is a side elevation of Fig. 7.

Fig. 9 is a cross section taken along the line IX—IX of Fig. 5.

Figs. 10 and 11 are details of the conveyer supporting and adjusting mechanisms.

Like numerals refer to similar parts in the several figures.

As shown in the drawings, my improved portable conveyer comprises an elongated, self contained conveyer 1, attached to and supported by a truck 2 adapted to be moved over the floor of a dock, warehouse, or similar suitable surface. The conveyer 1 consists of an endless carrying belt 3, mounted in a convenient frame which is preferably composed of the longitudinal steel angle bars 4 and 5, the upright angle bars 6 and the cross members 7, all suitably joined together and braced with diagonal members in the manner common in structural steel construction.

At the forward, or driving end, of the conveyer frame there is mounted a drum or pulley 8, arranged to engage the belt 3. The pulley 8 is attached to a transverse shaft 9 which is journaled in suitable bearings 10 supported in the end castings 11. To the projected end of the shaft 9 is attached a bevel gear 12 which engages the bevel pinion 13 fixed to the forward end of the shaft 14 extending along the side of the conveyer frame. A cover plate 15 is bolted to the casting 11 to form a dust proof chamber for the gears 12 and 13, which chamber is suitable to contain grease for the lubrication of the gears and bearings, and also serves to protect them from accidental injury or from contact with the person of operatives employed in the vicinity of the machine.

Attached to the castings 11 are ground wheels 16 which are adapted to engage the floor when the conveyer is in its elevated operative position.

At its rearward end, the shaft 14 is supported in a suitable bearing 17 mounted in the transmission gear case 18 which is attached to the conveyer frame. Within the gear case 18 is a train of speed reducing transmission gears through which the shaft 14 is connected with the armature shaft 19 of the electric motor 20 for the actuation of the conveyer. The motor 20 is supported in any preferred manner upon the conveyer frame, between the strands of the conveyer belt, and is supplied with actuating current through a suitable flexible conductor cable, from any convenient source of electric supply, in the manner well understood in the art. As these devices form no part in the present invention, their illustration and description at this time is not thought to be required.

At the rear, or driven end of the conveyer, there is mounted an idler roller 21, arranged to engage the belt 3, and supported in suitable journal bearings carried by the end castings 22. The end castings 22 are attached to the conveyer frame in a manner to permit limited movement longitudinally thereof under the control of the adjusting screw 23, to tension the belt.

At suitable intervals along the conveyer frame, and attached to the cross members 7, are brackets 24 upon which the belt supporting idler rollers 25, 26 and 27 are mounted. The two outer rollers 25 and 27 are so mounted as to be conveniently adjusted to the horizontal position shown by the solid lines of Fig. 9, to hold the belt flat for the transportation of relatively large packages, or to the inclined position indicated by the dotted lines in Fig. 9, to form a trough suitable for conveying bulk grain or similar material.

The truck 2 consists of a rectangular frame formed of the side sills 28 and the end sills 29 and 30, so as to provide a skeleton or open-topped support. This frame is supported upon castors 33, which afford a broad base of support easily movable in any direction to position the conveyer in the preferred relation to the material which is to be handled.

Attached to the side sills 28 are upstanding journal bearings 34 in which are journaled trunnions 35 fixed to the forward ends of the conveyer supporting and adjusting arms 36. The ends of the arms 36 remote from the trunnions 35 are attached to the shaft 37 which extends across the conveyer frame and is journaled in bearings 38 secured to the longitudinal angle bars 4 rearwardly of the center of gravity of the conveyer. Fixed to the arms 36, concentric with the trunnions 35, are segmental gears 39 in mesh with suitable pinions 40 fixed to the shaft 41. The shaft 41 extends across the truck frame, is supported in suitable bearings 42 attached to the side sills 28, and is connected through the gear train 43, 44, 45 and 46 with the hand wheel 47. When the hand wheel 47 is rotated in one direction, the arms 36 will rotate upwardly to elevate the rear end of the conveyer, and when it is rotated in the opposite direction, the arms 36 will rotate downwardly to depress the rear end of the conveyer. When depressed, the lift arms 36 drop into and are nested in the open-topped frame of the truck or support. A ratchet 48 and pawl 49 are provided to prevent downward rotation of the arms 36.

It will be seen that the arms 36 and the racks 39 form two point mountings for the struts on the truck or support. This gives a very stable base for the conveyer which is supported by the struts. With the pinions 40 provided with locking means, the struts may be held in various angles of adjustment. The curved racks 39 and actuating pinions provide an easily operated mechanism for shifting the parts to their various positions of adjustment. Furthermore, the arrangement is such that, as will be apparent from Figs. 2 and 3, a very compact relation of the parts is secured, when the conveyer is lowered to the support and rests thereon, after the rack portions of the strut pass through the open topped support and allow the conveyer to come directly down to the top of the truck.

When the machine is to be moved from one working place to another, the conveyer 1 is lowered into a horizontal position in which it rests directly upon the end sills 29 and 30 of the truck frame with the arms 36 collapsed within the truck frame. When in that position, the center of gravity of the conveyer coincides approximately with that of the truck, thereby evenly distributing the weight upon the castors 33 as shown in Fig. 2. When the hand wheel 47 is turned in the conveyer elevating direction, the conveyer frame 1 rotates about the forward end sill 30 until the wheels 16 of the conveyer frame engage the floor with the conveyer 1 in inclined, unbalanced position relative to said truck. As shown in Fig. 3. Further rotation of the hand wheel 47 will cause the transfer of the weight of the forward end of the conveyer to the ground wheels 16, thereby increasing the length of the supporting wheel base, and correspondingly increasing the stability of the apparatus during operation, even though a relatively short base truck or support is used. As the conveyer is completely self contained, it is apparent that it may be operated in the horizontal, so-called traveling position, in which it may form an element in a train of such conveyers, or it may be adjusted to any of its inclined positions for use in piling and stacking material. This quality renders the machine especially advantageous for all purposes for which such machines are required. While I have shown the particular and preferred form of my invention, it will be understood that equivalent mechanical expedients other than those herein disclosed may be adopted without departing from the range of my invention.

I claim:

1. In a machine of the class described, the combination with a wheel supported truck adapted to be moved in any direction over a suitable floor, of an elongated self-contained conveyer adapted to rest upon the frame of said truck in balanced position, an arm attached to said truck adjacent its center of gravity and adapted to rotation about a horizontal axis, said arm being also flexibly attached to said conveyer frame rearwardly of its center of gravity, and means to rotate said arm about said axis to lift said conveyer from said truck frame.

2. In a machine of the class described, the combination with a wheel supported truck adapted to be moved in any direction over a suitable floor, of an elongated self-contained conveyer adapted to rest upon the frame of said truck in balanced position, an arm attached to said truck adjacent its center of gravity and adapted to rotation about a horizontal axis, said arm being also flexibly attached to said conveyer frame rearwardly of its center of gravity, and means upon the truck to rotate said arm about said axis to lift said conveyer from said truck frame.

3. In a machine of the class described, the combination with a wheel supported truck adapted to be moved in any direction over a suitable floor, of an elongated self-contained conveyer adapted to rest upon the frame of said truck in balanced position, an arm attached to said truck adjacent its center of gravity and adapted to rotation about a horizontal axis, said arm being also flexibly attached to said conveyer frame rearwardly of its center of gravity, means to rotate said arm about said axis to lift said conveyer from said truck frame, and supplemental wheels attached to the forward end of said conveyer adapted to engage said floor when said conveyer is in its elevated position.

4. In a machine of the class described, the combination with a wheel supported truck adapted to be moved in any direction over a suitable floor, of an elongated self-contained conveyer adapted to rest upon the frame of said truck in balanced position, an arm attached to said truck adjacent its center of gravity and adapted to rotation about a horizontal axis, said arm being also flexibly attached to said conveyer frame rearwardly of its center of gravity, a gear segment attached to said arm concentric with said axis, a pinion engaging said gear segment, and means to rotate said pinion to lift said conveyer from said truck frame as and for the purpose set forth.

5. In a machine of the class described, the combination with a wheel supported truck adapted to be moved in any direction over a suitable floor, of an elongated self-contained conveyer adapted to rest upon the frame of said truck in balanced position, an arm attached to said truck adjacent its center of gravity and adapted to rotation about a horizontal axis, said arm being also flexibly attached to said conveyer frame rearwardly of its center of gravity, means to rotate said arm about said axis to lift said conveyer from said truck frame, and means within the control of the operator to prevent downward rotation of said arm.

6. In a machine of the class described, the combination of a support, a conveyer adapted to rest upon said support in balanced position, lift mechanism connecting said support and conveyer at a point removed from the center of gravity of said conveyer, and means to actuate said lift mechanism and elevate said conveyer to an inclined unbalanced position relative to said support.

7. In a machine of the class described, the combination of a support, a conveyer adapted to rest upon said support in balanced position, lift mechanism pivotally connecting said support and conveyer at a point removed from the center of gravity of said conveyer, and means on said support to actuate said lift mechanism and elevate said conveyer to an inclined unbalanced position relative to said support.

8. In a machine of the class described, the combination of a support, a conveyer adapted to rest upon said support in balanced position, a single lift mechanism pivotally connecting said support and conveyer at a point removed from the center of gravity of said conveyer, and means on said support to actuate said lift mechanism and elevate said conveyer to an inclined unbalanced position relative to said support.

9. In a machine of the class described, the combination of a truck, a conveyer adapted to rest in balanced position on said truck, a normally collapsed lift arm pivotally mounted on said truck and coupled to said conveyer at a point removed from the center of gravity of said conveyer, and means for actuating said lift arm to elevate said conveyer to an inclined unbalanced position relative to said truck.

10. In a machine of the class described, the combination of an open-topped truck; of a conveyer adapted to rest in balanced position on said truck; a lift arm pivotally mounted on said truck and coupled to said conveyer at a point removed from the center of gravity of said conveyer, said arm being normally nested within said open-topped truck; and gear mechanism to actuate said arm and elevate said conveyer to an inclined unbalanced position relative to said truck.

11. In a device of the class described, the combination of a truck having an open top; a conveyer adapted to rest in balanced position on said truck; a normally collapsed lift arm pivoted on said truck and coupled to said conveyer at a point removed from its center of gravity, said arm in collapsed position being nested in said open-topped truck; a gear segment on said arm; and a segment-engaging pinion on said truck to move said arm to a substantially vertical position and elevate said conveyer to an inclined unbalanced position relative to said truck.

12. In a machine of the class described, the combination of a wheeled truck, a conveyer adapted to rest on said truck in balanced position, of ground wheels at one end of said conveyer, a normally collapsed lift arm pivotally mounted on said truck and coupled to said conveyer at a point removed from its center of gravity, and means to move said lift arm from its collapsed to a substantially vertical position to elevate said conveyer to an inclined unbalanced position relative to said truck with its ground wheels in contact with the floor.

13. In a machine of the class described, the combination of a support, a conveyer adapted to rest upon said support in balanced position, a strut pivotally mounted on said support and pivotally connected with said conveyer, a rack extending angularly from said strut, a pinion spaced from the strut mounting to engage said rack, means for actuating said pinion to move said rack and rock said strut on its pivotal mounting, and means to hold said pinion in any position of adjustment.

14. In a machine of the class described, the combination of a support, a conveyer adapted to rest upon said support in balanced position, a substantially triangular strut pivotally mounted at its base on said support and pivotally connected at its apex with said conveyer, a rack at the base of said strut, a pinion spaced from the strut mounting to engage said rack, means for actuating said pinion to move said rack and rock said strut on its pivotal base mounting, and means to hold said pinion in different positions of adjustment.

15. In a machine of the class described, the combination of a support, a conveyer adapted to rest upon the said support in balanced position, a substantially triangular strut pivotally mounted at its base on said support and pivotally connected with said conveyer, a curved rack concentric with the pivotal base mounting of said strut, a pinion spaced from the strut mounting to engage said rack, means for actuating said pinion to move said rack and rock said strut on its pivotal base mounting, and means to hold said pinion in different positions of adjustment.

16. In a machine of the class described, the combination of an open topped support, a conveyer, a strut pivotally mounted on said support and pivotally connected to said conveyer, a rack extending angularly from said strut, a pinion spaced from the strut mounting to engage said rack, and means for actuating said pinion to move said rack and callapse said strut through the open topped support and bring said conveyer close to said support.

17. In a machine of the class described, the combination of a support, a conveyer, a substantially triangular strut pivotally mounted at one end of its base on said support and pivotally connected at its apex with said conveyer, a rack at the base of said strut, a pinion spaced from the strut mounting to engage said rack, and means for actuating said pinion to move said rack and collapse said strut through said open topped support and bring said conveyer close to said support.

In testimony whereof, I affix my signature.

ALEXIS W. LEMMON.